Figure 1:
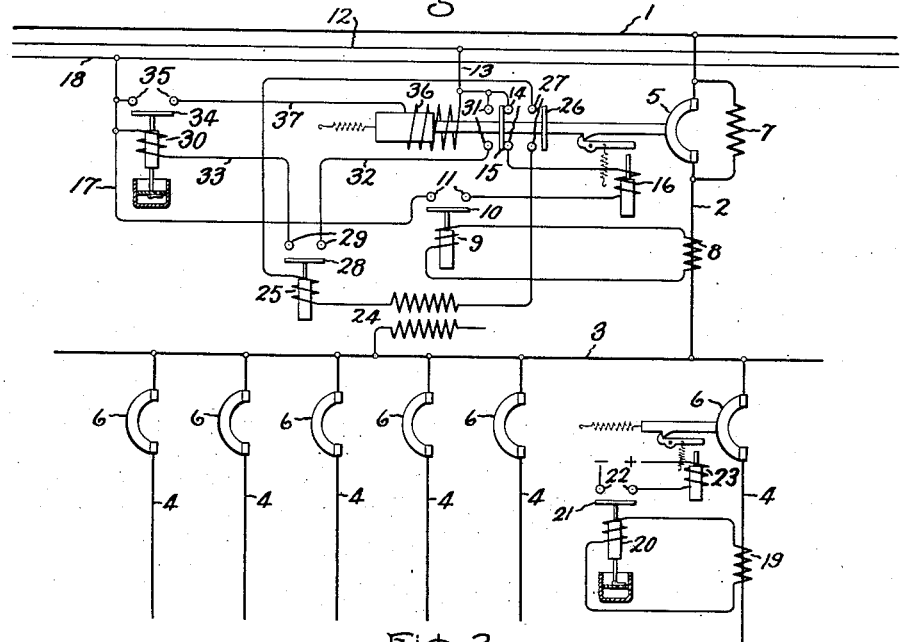

March 17, 1925.

O. C. TRAVER

GROUP FEEDER CONTROL SYSTEM

Filed March 30, 1921 2 Sheets-Sheet 1

1,530,443

Inventor:
Oliver C. Traver,
by [signature]
His Attorney.

March 17, 1925.

O. C. TRAVER 1,530,443

GROUP FEEDER CONTROL SYSTEM

Filed March 30, 1921 2 Sheets—Sheet 2

Inventor:
Oliver C. Traver,
by his Attorney.

Patented Mar. 17, 1925.

1,530,443

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

GROUP-FEEDER CONTROL SYSTEM.

Application filed March 30, 1921. Serial No. 457,082.

*To all whom it may concern:*

Be it known that I, OLIVER C. TRAVER, a citizen of the United States, residing at Schenectady, in the county of Schenectady, State of New York, have invented certain new and useful Improvements in Group-Feeder Control Systems, of which the following is a specification.

My invention relates to group feeder control systems and particularly to a control system for a plurality of feeders connected to a common distributing bus which is connected to a supply circuit by a group feeder.

In order to control such systems and provide adequate protection under abnormal conditions, particularly if severe in character, the group feeder and each of the feeders supplied thereby may be provided with circuit interrupters of sufficient capacity to interrupt the maximum current coincident with such conditions. This arrangement is, however, open to the objection of high first cost and is also expensive in repairs and maintenance. To avoid these costly features, the group feeder may be provided with a circuit interrupter of relatively high capacity as compared with the capacities of the interrupters in the feeder circuits; but, with this arrangement, it is obvious that the feeder interrupters should not operate upon current conditions in excess of their capacities. When such conditions occur, the group feeder interrupter being of relatively high capacity, as compared with the capacities of the feeder interrupters, should operate first and means must be provided for limiting the current to a value which the feeder interrupters can handle. On the other hand, if abnormal conditions on the feeders do not produce currents in excess of the capacities of the feeder interrupters, it is desirable that only the interrupters in the faulty feeders operate. If conditions are such, however, as to cause the group feeder interrupter to operate, it is desirable to restore normal service on the sound feeders in response to conditions following the cutting out of the faulty feeders.

An object of my invention is to provide improved means operative under certain predetermined conditions to interrupt the circuits of faulty feeders of the system without causing the opening of the group feeder and under other predetermined conditions to interrupt the group feeder and limit the current in the feeders to values which the feeder interrupters can handle.

Another object of my invention is to provide means operative in response to conditions following the opening of the group feeder interrupter and the feeder interrupters in the faulty feeders to restore the system to normal by reclosing the group feeder interrupter.

My invention will be better understood from the following description taken in connection with the accompanying drawings, and its scope will be pointed out in the appended claims.

Figure 2:
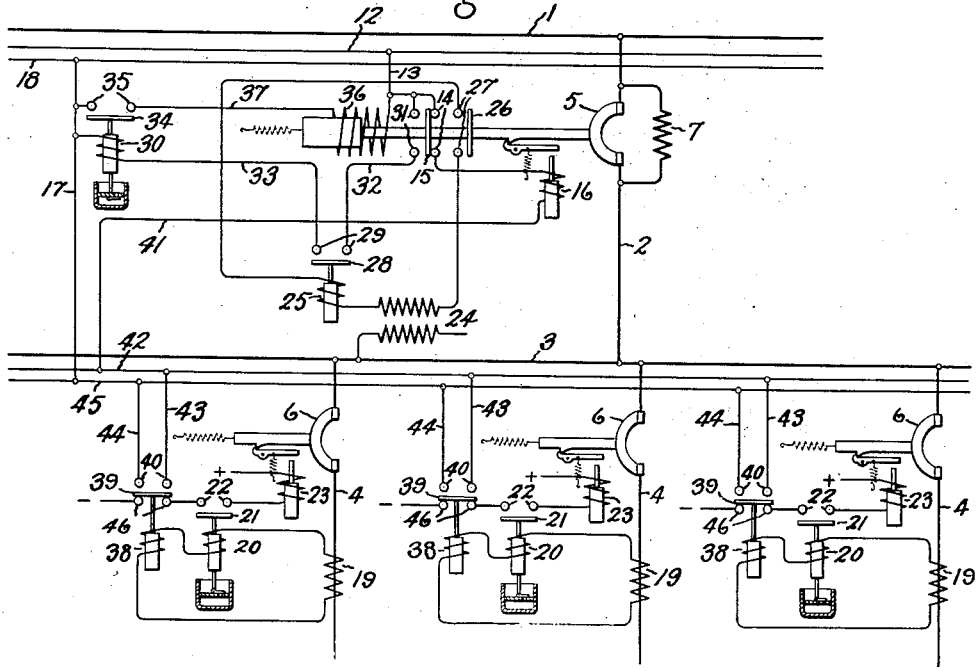
Figure 3:
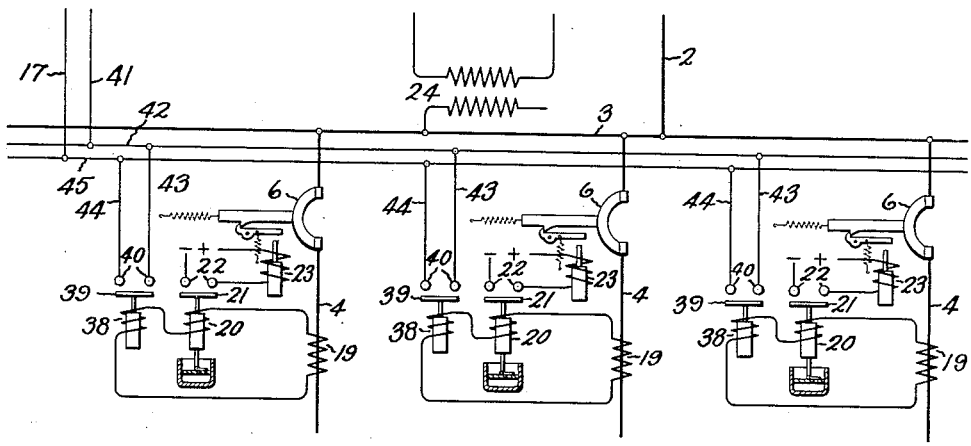
Figure 4:
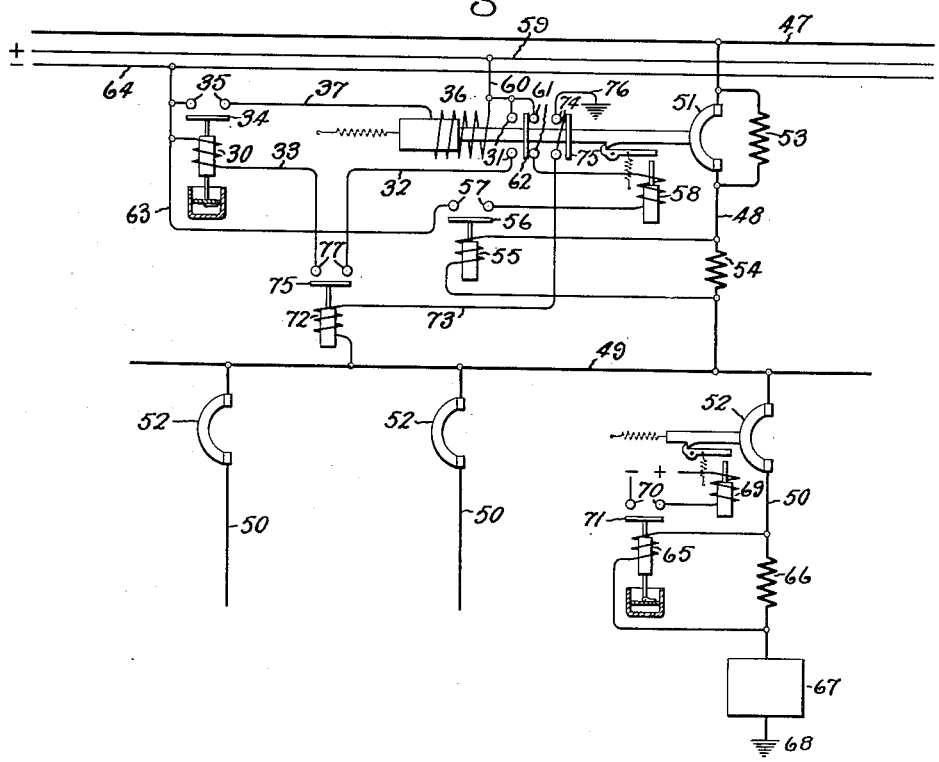

Fig. 1 is a diagrammatic illustration of an embodiment of my invention as applied to an alternating current system; Fig. 2 is a diagrammatic illustration of a modification of my invention as applied to an alternating current system; Fig. 3 is a diagrammatic illustration of a modification of a part of my invention as embodied in Fig. 2; and Fig. 4 is a diagrammatic illustration of a modification of my invention as embodied in a direct current system.

Fig. 1 shows by way of illustration and in a single line diagram for the sake of clearness, an embodiment of my invention as applied to an alternating current group feeder system comprising a generator or supply bus 1 connected by a group feeder 2 to a distributing bus 3 to which is connected a plurality of feeders 4. The group feeder 2 is provided with a main circuit interrupter 5, preferably of relatively high capacity, and the feeders 4 are provided with circuit interrupters 6 which may be of low capacity as compared with the interrupter 5. Across the interrupter 5 and in circuit with the group feeder 2 is a current limiting means 7 adapted to be short circuited by the interrupter 5 under normal operating conditions.

In circuit with the group feeder 2 is a transformer 8 having in circuit therewith an electroresponsive device 9 which may be of a type operative with a relatively small time delay, although I prefer to use a type known in the art as an instantaneous relay.

The electroresponsive device 9 is set to respond only upon currents exceeding the capacities of the feeder interrupters 6 and is provided with a contact controlling member 10 cooperating with contacts 11 to complete the control circuit of the tripping means for circuit interrupter 5. The control circuit for the tripping means comprises control bus 12, conductor 13, contacts 14, contact controlling member 15, trip coil 16, contacts 11, contact controlling member 10, conductor 17, and control bus 18. The contact controlling member 15 is operably related to the main circuit interrupter 5 and is arranged to bridge contacts 14 when circuit interrupter 5 is closed.

Upon the opening of circuit interrupter 5, the current limiting means 7 reduces the current fed to the distributing bus 3 and hence to the feeders 4, to an amount which the circuit interrupters 6 can safely interrupt. The circuit interrupters 6 in the feeders 4 are provided with control means operative with a time delay in response to predetermined abnormal conditions on the feeders 4. This control means, as shown for one of a plurality of feeders 4, comprises transformer 19 having in circuit therewith an electroresponsive device 20 of a type known in the art as a time delay relay. Electroresponsive device 20 is provided with a contact controlling member 21 cooperating with contacts 22 to complete the control circuit of trip coil 23.

In the event of an overload exceeding the capacities of the feeder interrupters 6, electroresponsive device 9 will operate to trip out the main circuit interrupter 5 and there will be a drop in voltage on the distributing bus 3 which will continue until the overload condition is removed by the opening of the faulty feeder in response to the electroresponsive devices 20. After the overloaded feeders have been cut out, it is desirable to reclose the main circuit interrupter 5 automatically, and to accomplish this, I provide means operative in response to the rise in voltage on the distributing bus 3 which occurs after the overloaded feeders have been cut out. This means comprises in circuit with the distributing bus 3, a potential transformer 24 having in circuit therewith an electroresponsive device 25 operative in response to the rise in voltage on the distributing bus 3, occuring subsequently to the opening of any of the feeders 4 upon the occurrence of faults thereon to control the operation of reclosing the circuit interrupter 5 and hence to short circuit the current limiting means 7. The circuit, including electroresponsive device 25 and the secondary of the transformer 24, is open when the circuit interrupter 5 is closed; but upon the opening of circuit interrupter 5, a contact controlling member 26 cooperatively related thereto bridges contacts 27 to complete the control circuit of the electroresponsive device 25.

When electroresponsive device 25 operates in response to the rise in voltage on the distributing bus 3, the contact controlling member 28 is moved in circuit closing direction to bridge contacts 29 thereby completing a control circuit including an electroresponsive device 30. The control circuit controlled by the electroresponsive device 25 includes control bus 12, conductor 13, contacts 31, contact controlling member 15, conductor 32, contacts 29, contact controlling member 28, conductor 33, electroresponsive device 30, conductor 17, and control bus 18. The contact controlling member 26 bridges contacts 27 only when the circuit interrupter 5 is open, so that electroresponsive device 25 is under normal operating conditions on an open circuit. Upon the completion of the control circuit including electroresponsive device 30, its contact controlling member 34 is moved to circuit closing position to bridge contacts 35 and thus complete the control circuit of the closing coil 36. This control circuit includes control bus 12, condutor 13, closing coil 36, conductor 37, contacts 35, contact controlling member 34, conductor 17 and control bus 18. The characteristics of electroresponsive device 30 are such as to hold its contact controlling member 34 in contact closing position for a time sufficiently great to insure that the circuit interrupter 5 will be securely latched in the closed position in response to the energization of the closing coil 36. Upon the closing of the interrupter 5, the control circuits of electroresponsive devices 25 and 30 are opened by contact controlling members 26 and 15 respectively, contact controlling member 15 moving in the direction to bridge the contacts 14 in the control circuit of the trip coil 16. In the event of overloads on the feeders 4, not exceeding the capacities of feeder interrupters 6, electroresponsive device 9 remains inoperative and the main circuit interrupter 5 is not opened, but electroresponsive device 20 operates with a time delay to move its contact controlling member 21 to bridge contacts 22, thus completing the control circuit of trip coil 23 of the interrupter in the faulty feeder and cutting out of the faulty feeder without interrupting continuity of normal service on the sound feeders.

Fig. 2 shows by way of illustration and in a single line diagram for the sake of clearness, a modification of my invention as applied to an alternating current group feeder system similar to that shown in Fig. 1. In this modification of my invention, I arrange the electroresponsive device which controls the trip circuit of the main circuit interrupter to respond to conditions in the feeders instead of conditions in the group feeder, as is the case in Fig. 1.

As before, I provide in circuit with the group feeders 4 transformers 19 having in circuit therewith electroresponsive devices 20, of a type known in the art as time delay relays, operative in response to predetermined conditions on the feeders 4 to control the opening of the interrupters 6. In circuit with the transformers 19 and electroresponsive devices 20 are electroresponsive devices 38, which may be of a type operative with a relative small time delay, although I prefer to use a type known in the art as an instantaneous relay. The electroresponsive devices 38 are set to respond only upon predetermined conditions on the feeders 4 exceeding the capacities of the interrupters 6 and are provided with contact controlling members 39 arranged to bridge contacts 40 and thereby complete the control circuit of the tripping means of the circuit interrupter 5 in the group feeder 2. This control circuit comprises control bus 12, conductor 13, contacts 14, contact controlling member 15, trip coil 16, conductors 41, 42 and 43, contacts 40, contact controlling member 39, conductors 44, 45 and 17; and control bus 18.

In the arrangement shown in Fig. 2, the electroresponsive devices 20 and 38 are so interlocked as to preclude any possibility of electroresponsive device 20 operating in advance of electroreponsive device 38 in the event of abnormal conditions on the feeders 4 exceeding the capacities of interrupters 6. Electroresponsive device 38 operates in advance of electroresponsive device 20 in response to abnormal conditions in excess of the capacities of the interrupters 6 and electroresponsive device 20 operates with a time delay to trip out the interrupters 6 in the faulty feeders.

In the event of an overload within the capacities of interrupters 6, electroresponsive device 20 operates with a time delay to complete the control circuit of trip coil 23, but if the overload is in excess of an amount which the circuit interrupters 6 can safely interrupt, electroresponsive device 38 which, under normal operating conditions, bridges contacts 46 in the control circuit of trip coil 23 by contact controlling member 39, will respond quickly to move contact controlling member 39 away from contacts 46 to bridge contacts 40, thus preventing the operation of trip coil 23 and completing the control circuit of the trip coil 16 of the circuit interrupter 5 in the group feeder 2. With the closing of this control circuit and the consequent opening of circuit interrupter 5, the current supplied to the distributing bus 3 is limited by the current limiting means 7 to a value such that electroresponsive device 38 drops back to its normal position with contact controlling member 39 bridging contacts 46 in the control circuit of trip coil 23. The control circuit of trip coil 23 will be completed by electroresponsive device 20 moving its contact controlling member 21 to bridge contacts 22, and circuit interrupter 6 will be opened, thus cutting out the faulty feeder.

Subsequently to the opening of the feeder interrupter 6 following the opening of the main circuit interrupter 5, there will be a rise in voltage on the distributing bus 3 and electroresponsive device 25 will operate, as heretofore described in connection with Fig. 1, to control the reclosing of circuit interrupter 5.

In the event of overloads on the feeders 4 not exceeding the capacities of feeder interrupters 6, electroresponsive device 38 remains inoperative and does not, therefore, open circuit contacts 46 in the control circuit of trip coil 23, and electroresponsive device 20 operates to complete the control circuit of trip coil 23, thus tripping out the circuit interrupter 6 in the faulty feeder without interrupting continuity of service on the sound feeders.

In Fig. 3 there is shown by way of illustration a modification of a part of my invention as embodied in Fig. 2. In this arrangement the electroresponsive devices 20 and 38 are not interlocked to prevent the opening of the circuit interrupter 6 in advance of the main circuit interrupter 5 on overloads in excess of the rupturing capacities of the feeder interrupter 6, but reliance is placed upon the time delay action of the electroresponsive device 20 to retard the closing of the control circuit of trip coil 23 for a time sufficient to insure, that the more rapid action of electroresponsive device 38 will trip out circuit interrupter 5 before electroresponsive device 20 can move its contact controlling member 21 to circuit closing position. With the exception of this difference, the arrangement is similar to that shown in Fig. 2.

In Fig. 4, I have shown an embodiment of my invention as applied to a direct current group feeder system comprising a supply bus 47 connected by a group feeder 48 to a distributing bus 49 to which is connected a plurality of feeders 50. The group feeder 48 is provided with a main circuit interrupter 51 of relatively high capacity and the feeders 50 are provided with circuit interrupters 52 of low capacity as compared with the circuit interrupter 51. Across the interrupter 51 and in circuit with the group feeder 48 is a current limiting means 53 adapted to be short circuited by interrupter 51 under normal operating conditions.

In circuit with the group feeder 48 across the resistance 54 is an electroresponsive device 55 operative in response to predetermined conditions in excess of the capacities of the circuit interrupters 52 to trip out the main circuit interrupter 51. The electroresponsive device 55 is provided with a contact controlling member 56 for bridging contacts 57 in the control circuit of the trip coil 58. This control circuit includes control bus 59, conductor 60, contacts 61, contact controlling member 62, trip coil 58, contacts 57, contact controlling member 56, conductor 63, and control bus 64. Each of the feeders 50 may be provided with control means similar to the one shown for controlling the operation of the circuit interrupters 52. This control means comprises an electroresponsive device 65 in circuit with the feeder 50 across a resistance 66, the feeder 50 supplying a load 67 with a ground return as at 68. Electroresponsive device 65 is of a type known in the art as a time delay relay and operates independently of electroresponsive device 55 in response to overloads within the capacity of circuit interrupter 52 to complete the control circuit of trip coil 69 through contacts 70 and contact controlling member 71.

If, however, the overload is of such a character as to exceed the capacities of circuit interrupters 52, electroresponsive device 55 operates in advance of electroresponsive device 65 thus tripping out circuit interrupter 51 and limiting the current supplied to the feeders 50 to an amount which the feeder interrupters 52 can safely interrupt. Subsequently to the tripping out of the main feeder interrupter under these conditions, electroresponsive device 65 operates to trip out the overloaded feeder.

In order to restore the system to normal, subsequently to the tripping out of the faulty feeder, I provide in circuit with the distributing bus 49 an electroresponsive device 72 operative in response to the rise in voltage following the tripping out of the faulty feeder to control the operation of reclosing the main circuit interrupter 51. Electroresponsive device 72 is in a circuit including the distributing bus 49, conductor 73, contacts 74, contact controlling member 75 and conductor 76 to ground. This circuit is normally open but is closed upon the opening of circuit interrupter 51 by means of the contact controlling member 75 cooperatively related thereto. The operation of electroresponsive device 72 in response to the rise in voltage on the bus 49 following the cutting out of the faulty feeder completes the control circuit through contact controlling member 75 and contact 77 of an electroresponsive device 30 which in turn operates to complete the control circuit of the closing coil 36, as described in connection with Fig. 1. It is apparent, therefore, that I provide means operative in response to predetermined conditions such that overloads within the range of the capacities of the feeder interrupters are taken care of without interrupting continuity of normal service on sound feeders; but upon the occurrence of abnormal conditions in excess of the rupturing capacities of the feeder interrupters, the feeders at fault are isolated after limiting the current supplied by the group feeder to the feeders of the system to a value within the range of the capacities of the feeder interrupters, thus permitting the operation of the feeder interrupters to cut out the faulty feeders subsequently to the opening of the group feeder, and, in the case where the group feeder interrupter is opened, means are provided for reclosing the same in response to conditions following the opening of the faulty feeders.

Although I have shown and described my invention in considerable detail, I do not wish to be limited to the specific details thereof, as shown and described, but may use such modifications, substitutions or equivalents thereof, as are embraced within the scope of my invention.

What I claim as new and desire to secure by Letters Patent of the United States, is:—

1. The combination with a supply circuit, a distributing bus, a plurality of feeders supplied by said bus, a group feeder between said supply circuit and said bus, a main circuit interrupter in said group feeder, current limiting means around said main circuit interrupter, normally short-circuited thereby, circuit interrupters in each of a plurality of said feeders, of electroresponsive means in circuit with said feeders operative with a time delay in response to predetermined overload conditions to open the circuit interrupters of the overloaded feeders, means operative in advance of said electroresponsive means in response to greater predetermined conditions of overload to open said main circuit interrupter whereby said current limiting means is placed in series with said group feeder, reclosing means for said main circuit interrupter and means for operating said reclosing means operative in responsive to the voltage on said distributing bus.

2. The combination with a supply circuit, a distributing bus, a plurality of feeders supplied from said bus, a main circuit interrupter between said supply circuit and said bus, current limiting means across said main circuit interrupter, circuit interrupters in each of a plurality of said feeders, electroresponsive means operative with a time delay in response to a current which is a measure of the overload on said feeders to open the interrupters in the feeders at fault, means in circuit with said electroresponsive means operative in advance of said electroresponsive means in response to predetermined conditions exceeding the capacities of said feeder interrupters to open the main circuit interrupter, means for reclosing said main circuit interrupter and means in circuit with said distributing bus operative in responsive to the rise in voltage subsequent to the opening of one or more feeder interrupters to close said main circuit interrupter.

3. An overload protective system comprising a supply circuit, a distributing bus, a plurality of feeders supplied from said bus, a main circuit interrupter of relatively high capacity between said supply circuit and said bus, current limiting means across said main circuit interrupter normally short-circuited thereby, a circuit interrupter of relatively low capacity in each of a plurality of said feeders, characterized by the fact that means are provided in circuit with each of a plurality of said feeders operative with a time delay in response to overloads on said feeders to open the circuit interrupters of the overloaded feeders, and by the fact that means are provided in circuit with said feeders and said first mentioned means operative in advance thereof in response to overloads in excess of the capacities of said feeder interrupters to open said main circuit interrupter, and by the fact that the main circuit interrupter is provided with reclosing means and means for operating the same responsive to the voltage on the distributing bus.

4. In a group feeder control system wherein a supply circuit is connected to a distributing bus by a main circuit interrupter of relatively high capacity and by a current limiting means across said circuit interrupter, and wherein a plurality of feeders is connected to said bus and each of a plurality of said feeders is provided with a circuit interrupter of relatively low capacity, the combination of electroresponsive means in circuit with said feeders operative with a time delay in response to a current which is a measure of the overload in said feeders to open said feeder interrupters, means in circuit with said electroresponsive means operative in advance of said electroresponsive means to open said main circuit interrupter and prevent said electroresponsive means from opening said feeder interrupters upon overload conditions in excess of the capacities of said feeder interrupters, reclosing means for said main circuit interrupter and means for operating said reclosing means responsive to the voltage on the distributing bus.

5. A protective system of the class described, comprising a supply circuit, a distributing bus, a plurality of feeders supplied from said distributing bus, a main circuit interrupter of relatively high capacity between said supply circuit and said bus, current limiting means across said main circuit interrupter normally short-circuited thereby, a circuit interrupter of relatively low capacity in each of a plurality of said feeders, means in circuit with said feeders operative with a time delay in response to predetermined overload conditions to open the circuit interrupters in the overloaded feeders, means in circuit with said first mentioned means operative in advance thereof in response to predetermined overload conditions exceeding the capacities of said circuit interrupters to open said main circuit interrupter, thereby placing said current limiting means in series with said bus, reclosing means for said main circuit interrupter, and means for operating said reclosing means responsive to the voltage on said distributing bus.

6. The combination with a supply circuit, a distributing bus, a plurality of feeders supplied by said bus, a main circuit interrupter of relatively high capacity in series with said supply circuit and said bus, current limiting means across said main circuit interrupter normally short-circuited thereby, circuit interrupters of relatively low capacity in each of a plurality of said feeders, of electroresponsive means in circuit with said feeders operative with a time delay in response to predetermined overload conditions to control the operation of the circuit interrupters in the feeders at fault, means operative in advance of said electroresponsive means in response to predetermined overload conditions exceeding the capacities of said feeder interrupters to open said main circuit interrupter, thereby placing said current limiting means in series with said supply circuit and distributing bus, whereby the current supplied to the overloaded feeders is limited to an amount within the capacities of the feeder interrupters, reclosing means for said main circuit interrupter and means for operating said reclosing means responsive to the voltage on the distributing bus.

7. The combination with a group feeder system comprising a supply circuit, a distributing bus, a main circuit interrupter of relatively high capacity between said supply circuit and said bus, current limiting means across said main circuit interrupter normally short-circuited thereby, a plurality of feeders supplied by said bus, a circuit interrupter of relatively low capacity in each of a plurality of said feeders, of electroresponsive means in circuit with said feeders operative in response to predetermined overload conditions on said feeders to open the circuit interrupters in the overloaded feeders, means in circuit with said feeders, and said electroresponsive means operative in response to overloads in excess of the capacities of said feeder interrupters to open said main circuit interrupter, thereby placing said current limiting means in series with said bus and to prevent said electroresponsive means from opening said feeder interrupters upon overload conditions in excess of the capacities of said feeder interrupters, reclosing means for said main circuit interrupter and means for operating said reclosing means responsive to the voltage on said distributing bus.

In witness whereof, I have hereunto set my hand this 29th day of March, 1921.

OLIVER C. TRAVER.